Patented July 22, 1952

2,604,468

UNITED STATES PATENT OFFICE 2,604,468

CHLORITE - SULFITE REDOX - INITIATED AQUEOUS POLYMERIZATION OF VINYL CHLORIDE

Julius E. Underwood and Archie Hill, Painesville, Ohio, assignors to Diamond Alkali Company, Cleveland, Ohio, a corporation of Delaware No Drawing. Application November 6, 1950, Serial No. 194,374

9 Claims. (Cl. 260—92.8)

This invention relates to a method for polymerizing vinyl chloride monomer to high molecular weight polymers, and more particularly relates to a method for the polymerization of vinyl chloride employing a redox system in which the polymerization initiators are sulfite ions and chlorite ions.

It has heretofore been taught in the art of polymerizing olefinic compounds, such as vinyl chloride, that in order to effect polymerization it is necessary to provide a source or sources of free radicals within the polymerization reaction medium. It has been proposed to provide a mixture of a peroxidic oxidizing agent and a suitable reducing agent, now referred to in the art as a redox system, as a source of free radicals for initiating and sustaining the polymerization of such olefinic type compounds.

It has also been proposed to polymerize vinyl chloride dispersed in an aqueous medium containing an organic or inorganic peroxidic oxidizing agent and a suitable reducing agent. Moreover, it has been proposed broadly to employ certain non-peroxidic inorganic oxidizing agents in emulsion polymerization of olefinic type compounds. This broad proposal, however, has been found to be grossly inadequate, and inaccurate in specific instances, in providing any principle from which the art might deduce methods suitable for effecting the polymerization of olefinic compounds broadly, or the polymerization of vinyl chloride specifically. Moreover, the proposal has met with substantially no acceptance in the art, apparently because of the fact that in the system proposed, insufficient free radicals were produced to initiate and sustain the polymerization reaction for periods of time sufficient to realize commercial yields of polymerizate.

It has now been found that chlorous acid, or a water-soluble chlorite salt in an aqueous acidic medium, in conjunction with sulfurous acid, or a water-soluble sulfite or bisulfite salt in such medium, initiates the polymerization of vinyl chloride and sustains the same over a period of time sufficient to effect the polymerization of substantially all of the vinyl chloride dispersed in the aqueous medium containing the redox system, and at a rate comparable to that obtainable by peroxidic oxidizing agents in combination with sulfites. Without intending to be limited in any way by theoretical considerations as to the natural laws underlying the invention, it seems probable that reaction of the chlorite ions with the sulfite ions in the aqueous medium and in contact with the monomeric vinyl chloride, proceeds in a stepwise manner to produce free radicals. Moreover, it appears that the rate at which the free radicals may be produced is sufficient to initiate and sustain the polymerization reaction over extended periods of time.

Certain advantages obtain from the use of chlorites in combination with sulfites as a redox system over the combination of peroxidic oxidizing agents with various reducing agents, such as sulfites, for the same purpose in the polymerization of vinyl chloride. Thus, the chlorites of the alkali metals, particularly the lower atomic weight alkali metals, such as lithium, sodium and potassium, are more stable on storage than are the corresponding salts of peroxidic acids, such as the alkali metal salts of persulfuric acid, and are cheaper and more easily manufactured on a commercial scale than the peroxidic salts. Moreover, the alkali metal chlorites have been found to be especially suitable in combination with sulfites in initiating the polymerization of vinyl chloride.

Although chlorites are considered generally as strong oxidizing agents which react rapidly with strong reducing agents, particularly the sulfites, it has now been found that the reaction of a water-soluble chlorite salt with a water-soluble sulfite salt in an aqueous acid medium may be so moderated, when there is also dispersed within the acidic medium a suitable amount of monomeric vinyl chloride, as to provide sufficient free radicals (probably sulfite or bisulfite radicals, although it is possible that the chlorite ion may also exist in solution as a free radical) to initiate and sustain the polymerization of vinyl chloride over a period of 2–3 hours, whereby the polymerization of vinyl chloride in contact with the acidic medium containing the sulfite-chlorite redox system may become 85–90% complete within the above-noted time and gives polymers having molecular weights of the order of 80,000–115,000.

The molecular weight values referred to herein are calculated from the viscosity of a solution of one gram of polymerizate in 100 mls. of solvent (cyclohexanone), as determined by means of a modified "Ostwald" viscosimeter tube immersed in a constant temperature bath.

One of the objects of the present invention is to provide a method for the polymerization of vinyl chloride in which polymerization initiators having improved properties particularly over peroxidic compounds are employed.

Another object of the invention is to provide an aqueous redox system for the emulsion polymerization of vinyl chloride, in which system chlorous and sulfurous acids, or water-soluble salts of these acids, are employed as a source of the polymerization initiators.

These and other objects will be apparent to those skilled in the art from a more detailed description of the invention offered hereinafter.

The present invention contemplates the steps of dispersing monomeric vinyl chloride in an aqueous acidic medium containing a water-soluble source of sulfite ions and a water-soluble source of chlorite ions, said source of sulfite ions being in excess of the equivalent molecular proportion of said source of chlorite ions, and recovering a vinyl chloride polymerizate from said medium.

In accordance with the method of the present invention, monomeric vinyl chloride is dispersed in an aqueous acidic medium containing the chlorite-sulfite redox system, at a pressure sufficient to liquefy monomeric vinyl chloride at the ambient temperature. Temperatures of the order of 25°–50° C. may be employed, it having been found that temperatures within the range of 35°–45° C. give good yields of high molecular weight polymerizates within a relatively short reaction time. The dispersion of the vinyl chloride in the aqueous medium may be effected either solely mechanically, in which case the polymerization technique is referred to as suspension polymerization, or with the aid of a suitable emulsifying agent, in which case the polymerization technique is referred to as emulsion polymerization. It will, of course, be appreciated by those skilled in the art that the emulsifying agent employed to emulsify the monomeric vinyl chloride is of such a chemical nature as not to interfere materially with the polymerization reaction. In this connection it has been found generally that emulsifying agents which have conjugated olefinic double bonds within their molecular structure are the least desirable type of emulsifying agents to be employed. On the other hand emulsifying agents, such as the anion active agents exemplified by alkyl sulfates, alkyl sulfonates, alkyl aryl sulfonates, cation active agents exemplified by quaternary ammonium compounds, and non-ionic emulsifying agents of the type of polyglycols, polyglycol esters and ethers, and the like are suitable for the purposes of the present invention where their molecular structure does not contain conjugated olefinic double bonds.

In preparing the aqueous acidic medium containing the chlorite-sulfite redox system in which the monomeric vinyl chloride is to be dispersed, either as a suspension or in conjunction with a suitable emulsifying agent, it is desirable to have the pH of the medium substantially within the range of 1–7, preferably within the range of 2.5–6, the adjustment of the pH initially being effected by means of a suitable nonoxidizing or reducing acid, such as sulfuric acid or acetic acid. Buffers may be used in conjunction with the chlorite and sulfite salts employed herein as polymerization initiators so long as such buffers are themselves not oxidizing or reducing agents. It will be found in general that the pH of the aqueous acidic medium containing the redox system will, in the absence of buffers, decrease during the course of the polymerization reaction. The decrease is most substantial where the pH is initially between 4–6, within which range the pH normally drops to a minimum of about 2.5 at the end of the reaction. Below an initial pH of about 4, the decrease in pH, i. e., the increase in the hydrogen ion concentration during the reaction, is generally found to be of the order of 0.2 to 0.5 pH unit. When buffer salts are used to maintain the pH of the polymerization medium within a more narrow range, the pH change will generally amount to somewhat less than 0.5 pH unit. Buffers which have been found suitable for the purposes herein include acetic acid-sodium acetate, the universal buffer of Britton & Robinson ("Hydrogen Ions"—Britton, 2nd ed., page 225) consisting of acetic acid-phosphoric acid-boric acid-NaOH, and the like.

The redox system may include any of the water-soluble sources of chlorite and sulfite ions, either as chlorous acid and sulfurous acid or as water-soluble salts of these acids. The water-soluble salts contemplated within the scope of the present invention include the alkali metal salts of chlorous acid and sulfurous acid, the relatively less water-soluble alkaline earth metal salts and heavy metal salts of these acids, as well as the normally gaseous anhydride of sulfurous acid. The sulfite component of the redox system is also intended to include the corresponding bisulfite salts.

It is preferred in the practice of the method of the present invention to employ the common alkali metal salts of sulfurous and chlorous acids, i. e., the sodium and potassium salts of these acids, for reasons of economy and ease of storage and handling, since the Na and K chlorites are non-hygroscopic and very stable, as are the Na and K sulfites.

In the redox system the source of sulfite ions is preferably employed in excess of the equivalent molecular proportion of the source of chlorite ions. Thus, the amount of sulfite ion provided during the course of the polymerization reaction is preferably in excess of that required for reaction with the chlorite ion supplied to the reaction medium. The equivalent molecular proportions of sulfite to chlorite employed may be suitably within the range from 2:1 to 4:1, it having been found that, in general, substantially no advantage obtains from employing higher sulfite to chlorite ratios. In accordance with the above, in choosing a particular redox system, as will be appreciated by those skilled in the art, the amount of the source of sulfite ions is suitably from two to four times that theoretically required to reduce the chlorite to chloride, or stated conversely, the amount of chlorite to be employed is suitably within the range of ½ to ¼ that required to oxidize the sulfite ions to sulfate.

The proportion which the total of the components of the redox system bears to the vinyl chloride may suitably be substantially within the range of 0.5–2 mole percent, i. e., the sum of the moles of chlorite ions and sulfite ions may suitably be substantially within the range of 0.5–2 mole percent of the vinyl chloride monomer. Preferably, the sum of the moles of sulfite ions and chlorite ions is within the range of 0.6–1 mole percent of the vinyl chloride monomer.

The relative proportions of aqueous acidic medium to liquid vinyl chloride to be employed in any given polymerization reaction are preferably within the range of 2:1 to 4:1 parts by weight, preferably within the range of 2.5:1 to 3.5:1, and most suitably about 3:1.

It has been found in the practice of the method of the present invention that it is preferable that the vinyl chloride monomer be in contact with the sulfite and chlorite containing solution at the time they are brought into reacting relationship, so that their ability to initiate polymerization is not uselessly dissipated. Thus, either the source of sulfite ions or the source of chlorite ions may be dissolved in the aqueous acidic phase first, together with a suitable dispersing agent if desired, the monomer dispersed in the aqueous medium, and finally the remaining member of the redox system added to the aqueous acidic medium containing the dispersed vinyl chloride. In the preferred method of practicing the present invention, however, initially either the source of sulfite ions or the source of chlorite ions is dissolved in the aqueous acidic medium, and the remaining member of the redox system added to the acidic medium in the form of a solution simultaneously with the addition and dispersion of the monomeric vinyl chloride therein.

In order that those skilled in the art may better understand the method of the present invention, the following specific example is offered:

*Example*

In 300 parts of water, there are dissolved 1.04 parts of sodium sulfite (0.0082 mol), 1 part lauryl sulfate purified to remove polymerization inhibitors and sodium sulfate. The pH of the aqueous medium is adjusted to the values indicated in the table below with a 10% solution of sulfuric acid. A 5% solution of sodium chlorite in sufficient amount to provide 0.267 part of sodium chlorite (0.003 mol), and 100 parts of liquid monomeric vinyl chloride are dispersed in the aqueous medium simultaneously. The temperature of the polymerization reaction medium is maintained substantially constant at 40° C., and the system is held under autogenous pressure; the time values given in the table are measured from the time the chlorite and vinyl chloride are introduced into the aqueous medium. The results of carrying out the polymerization at various pH's within the range of 2-7 are given in the table below:

| pH | | Time (Hrs.) | Percent Conversion | Molecular Weight [1] |
|---|---|---|---|---|
| Initial | Final | | | |
| 7.0 | 6.6 | 6.17 | 12 | 115,400 |
|  | 6.68 | 23 | 28 |  |
| 6.0 | 2.75 | 0.57 | 40 | 92,600 |
|  | 2.81 | 1.17 | 58 |  |
|  |  | 1.75 | 76 |  |
| 5.0 | 2.58 | 0.57 | 37 | 87,900 |
|  | 2.63 | 1.17 | 56 |  |
|  |  | 1.75 | 75 |  |
| 4.0 | 2.55 | 0.57 | 40 | 91,400 |
|  | 2.60 | 1.17 | 54 |  |
|  |  | 1.75 | 68 |  |
|  |  | 2.33 | 82 |  |
| 3.0 | 2.48 | 0.57 | 41 | 90,600 |
|  | 2.47 | 1.17 | 51 |  |
|  |  | 1.75 | 61 |  |
| 2.0 | 1.81 | 0.57 | 34 | 88,800 |
|  | 1.80 | 1.17 | 37 |  |

[1] Calculated from the viscosity of a 1 per cent solution of polymer in cyclohexanone.

While there has been described an embodiment of the invention, the methods described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. The method of polymerizing monomeric vinyl chloride which includes the steps of dispersing monomeric vinyl chloride in an aqueous acidic medium containing sulfite ions and chlorite ions, said sulfite ions being in excess of the equivalent molecular proportion of said chlorite ions, and recovering a vinyl chloride polymerizate from said medium.

2. The method of claim 1 in which the molar proportions of sulfite ions to chlorite ions are substantially within the range 2:1 to 4:1, and in which the ratio of the weight of the aqueous phase to non-aqueous phase is 2:1 to 4:1.

3. The method of polymerizing vinyl chloride which includes the steps of dispersing monomeric vinyl chloride in an aqueous acidic medium containing an alkali metal sulfite and an alkali metal chlorite, said alkali metal sulfite being in excess of the equivalent molecular proportion of said alkali metal chlorite, maintaining the pH of said medium substantially within the range of 1-7 during the polymerization reaction, and recovering a vinyl chloride polymerizate from said medium.

4. The method of claim 3 in which the molar ratio of said alkali metal sulfite to said alkali metal chlorite is substantially within the range of 2:1 to 4:1, and in which the ratio of the weight of the aqueous phase to non-aqueous phase is 2:1 to 4:1.

5. The method of polymerizing vinyl chloride which includes the steps of dispersing vinyl chloride in an aqueous acidic medium containing an alkali metal sulfite and an emulsifier for said vinyl chloride, adding an alkali metal chlorite to said medium, said alkali metal sulfite being in excess of the equivalent molecular proportion of said alkali metal chlorite, maintaining the pH of said medium substantially within the range of 1-7 during the polymerization reaction, and recovering a polymerizate of vinyl chloride from said medium.

6. The method of claim 5 in which the molar ratio of said alkali metal sulfite to said alkali metal chlorite is substantially within the range of 2:1 to 4:1.

7. The method of polymerizing vinyl chloride which includes the steps of dispersing vinyl chloride in an aqueous acidic medium containing an alkali metal chlorite and an emulsifier for said vinyl chloride in said medium, adding an alkali metal sulfite to said medium, said alkali metal sulfite being in excess of the equivalent molecular proportion of said alkali metal chlorite, maintaining the pH of said medium substantially within the range of 1-7 during the polymerization reaction, and recovering a polymerizate of vinyl chloride from said medium.

8. The method of polymerizing vinyl chloride which includes the steps of dispersing monomeric vinyl chloride in an aqueous acidic medium containing a dissolved salt of the group consisting of sodium and potassium sulfites and a dissolved salt of the group consisting of sodium and potassium chlorites, the molar ratio of said sulfite to said chlorite being substantially within the range of 2:1 to 4:1, maintaining the pH of said medium substantially within the range of 1-7 during the reaction period, maintaining the temperature of said medium substantially within the range of 25°-50° C. during the polymerization reaction, and recovering a polymerizate of vinyl chloride from said medium.

9. The method of claim 8 in which the weight of the aqueous phase is from two to four times the weight of the monomeric vinyl chloride.

JULIUS E. UNDERWOOD.
ARCHIE HILL.

No references cited.